3,755,567
METHOD FOR TREATING ALCOHOLISM
Hamao Umezawa, Tokyo, and Motoi Ogata, Ebetsu, Japan, assignors to Zaidan Hojin Biseibutsu Kagaku Kenkyu Kai, Tokyo, Japan
No Drawing. Filed Apr. 2, 1971, Ser. No. 130,786
Int. Cl. A61k 27/00
U.S. Cl. 424—263
1 Claim

ABSTRACT OF THE DISCLOSURE

Therapeutic compositions having antialcoholism action, in which the active agent is a compound selected from the group consisting of calcium 5-butylpicolinate and calcium 5-pentylpicolinate, said agent being present in the amount of about 50 to 200 mg. per unit dose of the composition.

---

This invention relates to new therapeutic compositions having antialcoholism action. More particularly, the invention relates to the calcium salts of 5-butyl picolinic acid and 5-pentylpicolinic acid having antialcoholism-activity and formulations thereof as therapeutically useful compositions.

The active compounds effective for treatment of alcoholism in accordance with the present invention can be identified as 5-alkylpicolinic acids of the formula:

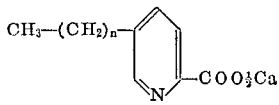

wherein $n$ is 3 or 4.

The compounds of this invention are active when administered orally. In order to ensure proper absorption and favorable therapeutic effect, they are preferably incorporated in suitable conventional carriers such as refined sugar, lactose, starch, calcium carbonate, coconut oil, etc. The oral use of these compounds is preferred over the subcutaneous or the intramuscular injection. Moreover, these compounds are effective when orally administered. In clinical use of these compounds, the recommendable dosage is 200–800 mg. per day, dividedly 3 or 4 times. Thus, in preparing tablets or capsules with pharmaceutical carriers, the formulation should preferably contain 50–200 mg. of active drug per dosage unit.

In the systematic screening studies of fungal compounds inhibiting dopamine $\beta$-hydroxylase, it was discovered by the present inventors that 5-butylpicolinic acid has the strong activity of inhibiting this enzyme reaction. This compound has been known as an antibiotic called fusaric acid. Dopamine $\beta$-hydroxylase is one of the enzymes working for bioxynthesis of norepinephrine, and 5-butylpicolinic acid was found by the present inventors to markedly reduce the epinephrine content in various tissues such as heart muscle, and adrenal glands. The decrease of epinephrine in the brain is slight and this compound shows only very weak sedative effect. On the basis of these discoveries, new therapeutic compositions comprising calcium 5-butyl-picolinate as the antialcoholism agent were invented. When 100 mg. or 150 mg. of calcium salt of 5-butylpicolinic acid was orally given to alcoholism patients three times a day and the administration was continued for 6 days, then all alcoholism patients (6 patients) decreased their capacity of drinking alcohol and showed natural alcohol reaction after drinking 200 cc. of Japanese sake containing alcohol at 15%. Before this treatment these patients drank 1.5–2 liters of strong Japanese sake containing alcohol at 25% daily. Moreover, after this treatment, the attitude of these patients to alcohol became almost normal and they stopped Japanese sake drinking.

As reported by Goldstein et al. (Life Sciences, Oxford, 3, 763–767, 1964) and Musacchio et al. (Life Sciences, Oxford, 3, 769–775, 1964), disulfiram which is a known compound used for treatment of alcoholism has been known to inhibit dopamine $\beta$-hydroxylase. Disulfiram has also another activity to inhibit aldehyde dehydrogenase.

Based on the latter effect, disulfiram caused unfavourable side effect. Comparing disulfiram, fusaric acid does not cause the side effect and is very effective in treating alcoholism patient.

5-pentylpicolinic acid has the same activity as the fusaric acid. These compounds have been confirmed clinically to have extremely low toxicity. In clinical experiments of these compounds treating hypertensive diseases, these compounds have been given to patients 200–800 mg. daily for 3 months and no side effects were observed.

In dog tests, calcium salts of these compounds have been confirmed to be not irritating to dogs. The free acids caused vomiting.

The activity of these compounds against dopamine $\beta$-hydroxylase was discovered by Umezawa, one of the inventors of this invention, and his coworkers as reported in Chem. and Pharm. Bulletin (Japan), 17, 2377, 1969.

5-butylpicolinic acid given orally to seven dogs in a dose of 20 mg./kg. caused vomiting in five dogs within 5–30 minutes after the administration. 5-pentylpicolinic acid in a dose of 20 mg./kg. also caused vomiting in four among seven dogs. However, the calcium salts of each of these acids in the same dose caused no vomiting and no toxic signs in seven dogs. Their calcium salts in doses of 200 mg./kg. three time a day also caused no vomiting and no toxic signs in 20 hypertensive patients.

The structure of the acids suggests that they are capable of chelating with metal ions. Though some salts of these acids have been published, there have been no reports on the preparation and properties of the calcium salts before this invention. The calcium salts of these acids were first prepared by the present invention. The calcium salts did not cause vomiting in dogs and were well tolerated. They showed the same therapeutic effect as the acids. $LD_{50}$ of the calcium salt was 125 mg./kg. both by the intraperitoneal and by the intramuscular injection. Though 5-butylpicolinic acid is irritating to the stomach, the oral administration of the calcium salt does not cause vomiting in dogs. Fifty or one hundred mg./kg. of the calcium salt in the tablet or in the capsule four times daily were well taken by hypertensive patients without without any toxic sign, and during 7 to 20 days of the administration, the blood pressure was gradually reduced. No toxic signs appeared during the daily administration for 90 days.

The concentrations of the homologues for 50% inhibition of dopamine $\beta$-hydroxylase were as follows: $n=0$, $3.5\times10^{-6}$ M; $n=1$, $5.0\times10^{-6}$ M; $n=2$, $2.2\times10^{-6}$ M; $n=3$, $3.0\times10^{-7}$ M; $n=4$, $7.5\times10^{-8}$ M; $n=5$, $5.0\times10^{-8}$ M; $n=6$ $1.3\times10^{-7}$ M; $n=7$, $2.3\times10^{-7}$ M; $n=8$, $6.8\times10^{-7}$ M; $n=9$, $2.3\times10^{-6}$ M.

The toxicities of these compounds in terms of intraperitoneal $LD_{50}$ values (mg./kg. body weight) in mice were as follows: $n=0$, 360; $n=1$, 175; $n=2$, 125; $n=3$, 120; $n=4$, 80; $n=5$, 70; $n=6$, 85; $n=7$, 45; $n=8$, 62; $n=9$, 75.

As described above among the 5-alkylpicolinic acids, the effect of inhibiting dopamine $\beta$-hydroxylase was found by Umezawa et al. to be the strongest in 5-butyl and 5-pentylpicolinic acids.

Before the present invention, there had been no observation of the antialcoholism effect of 5-butylpicolinic acid and 5-pentylpicolinic acid.

New therapeutic compositions comprising calcium salts of 5-butylpicolinic acid and 5-pentylpicolinic acid causing no stomach irritation are provided by the present invention.

As described above, it was established by the present invention that 5-butyl and 5-pentylpicolinic acids inhibit dopamine β-hydroxylase and are effective against alcoholism, and although these acids themselves are irritating to the stomach, their calcium salts are not irritating and are useful for the treatment of alcoholism. The following examples will show how the active compounds of the present invention can be prepared, as well as the preparation of typically orally administrable formulations of the active compounds, but it is to be understood that these examples are given by way of illustration and not of limitation.

EXAMPLE 1

5-butylpicolinic acid (150 mg.) was dissolved in 3 ml. of water at 50° C. and the hot solution was treated with 100 mg. of calcium chloride in 1 ml. of water and adjusted to pH 6.8 with 3% aqueous ammonia to deposit 160 mg. of the calcium salt as fine needles.

EXAMPLE 2

A solution of 15 mg. of 5-pentylpicolinic acid in 3 ml. of water and 0.5 ml. of methanol was treated with 10% aqueous calcium chloride and brought to pH 6.8 with dilute ammonia water to deposit 170 mg. of the calcium salt.

EXAMPLE 3.—TABLETS

A granulation was prepared of

| | Parts |
|---|---|
| Lactose | 68 |
| Starch | 32 |

Water, a sufficient quantity.

The granulation is dried and screened.

| | G. |
|---|---|
| Calcium 5-butylpicolinate | 50 |
| Lactose granulation | 197.5 |
| Magnesium stearate | 2.5 | are mixed well together and compressed into tablets weighing 250 mg. and containing 50 mg. of the salt.

EXAMPLE 4.—CAPSULES

A mixture is prepared, containing equal parts by weight of calcium 5-pentylpicolinate and lactose. The mixture is then filled, 200 mg. per capsule, into standard clear gelatin capsules and after closing, the capsules are dusted with talc or corn starch. The resulting capsules contain 100 mg. of the salt per dosage unit.

In the foregoing Examples 3 and 4, it will be understood that calcium 5-butylpicolinate or calcium 5-pentylpicolinate can be substituted for one another as the active component.

What we claim is:

1. A method for treating alcoholism comprising administering to a human suffering from alcoholism a member selected from the group consisting of calcium 5-butylpicolinate and calcium 5-pentylpicolinate in an amount between 200 and 800 mg. per day.

References Cited

Chemical Abstracts 71: 29127y (1969).

JEROME D. GOLDBERG, Primary Examiner